United States Patent [19]
Eft

[11] 4,018,192
[45] Apr. 19, 1977

[54] WATER INJECTION SYSTEM FOR I.C. ENGINES
[76] Inventor: Sheldon E. Eft, 1014 E. Taylor St., Bloomington, Ill. 61701
[22] Filed: July 3, 1975
[21] Appl. No.: 592,823
[52] U.S. Cl. .......................... 123/25 C; 123/139 AJ
[51] Int. Cl.² ........................................ F02D 19/00
[58] Field of Search ............ 123/25 C, 25 R, 25 A, 123/25 P, 139 AJ, 32 SJ, 169 V; 261/18 A

[56] References Cited
UNITED STATES PATENTS

| 1,286,435 | 12/1918 | Slate | 123/32 SJ |
| 1,376,277 | 4/1921 | Higgins, Jr. | 123/139 AJ |
| 2,879,753 | 3/1959 | McKinley | 123/139 AJ |
| 3,490,422 | 1/1970 | Bullis | 123/25 R |
| 3,665,902 | 5/1972 | Bloomfield | 123/32 SJ X |

FOREIGN PATENTS OR APPLICATIONS 637,584    5/1950    United Kingdom ............ 123/32 SJ Primary Examiner—C. J. Husar
Assistant Examiner—Ira S. Lazarus
Attorney, Agent, or Firm—Fitch, Even, Tabin & Luedeka

[57] ABSTRACT

A water injection system for internal combustion engines comprises adapter means located at the spark plug openings and including water injection nozzles and ignition generating electrodes projecting into the combustion chambers. Pressure of the ignited fuel mixture in the combustion chambers drives a water injection piston of an inexpensive water injector attached to the adapter means.

8 Claims, 6 Drawing Figures

U.S. Patent  April 19, 1977  4,018,192
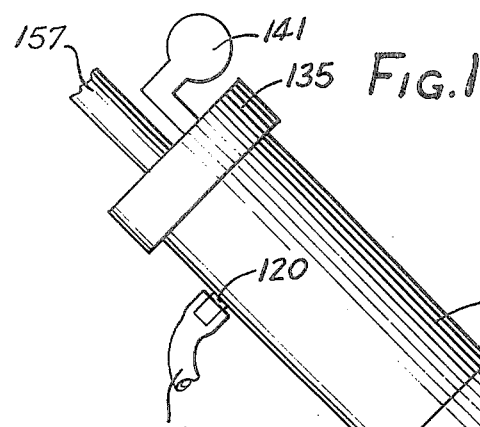
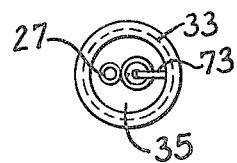
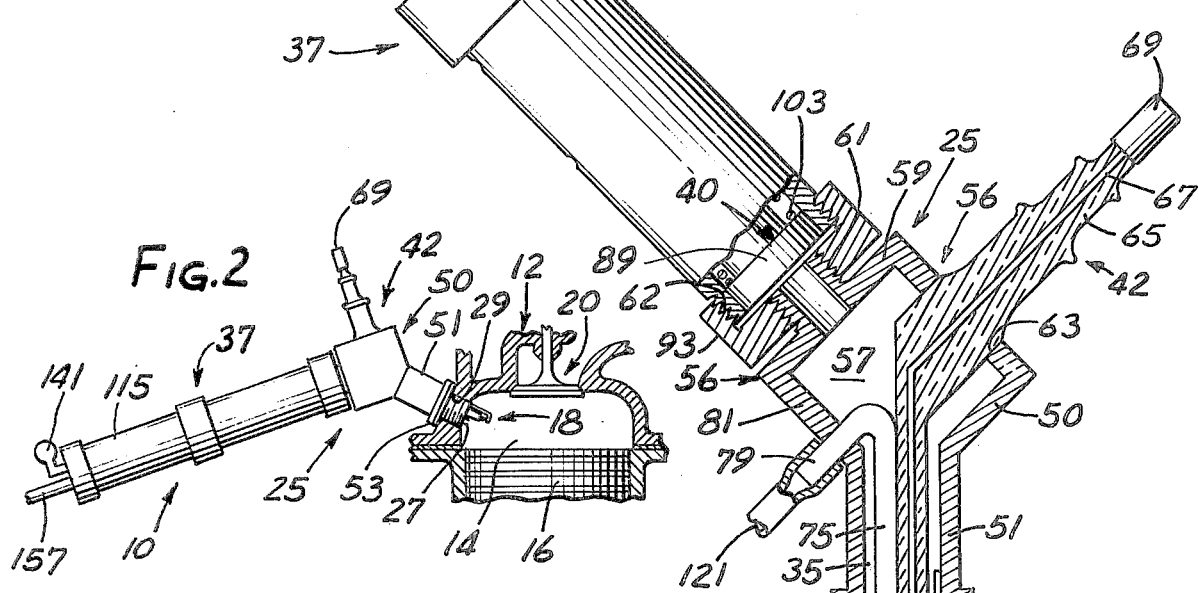
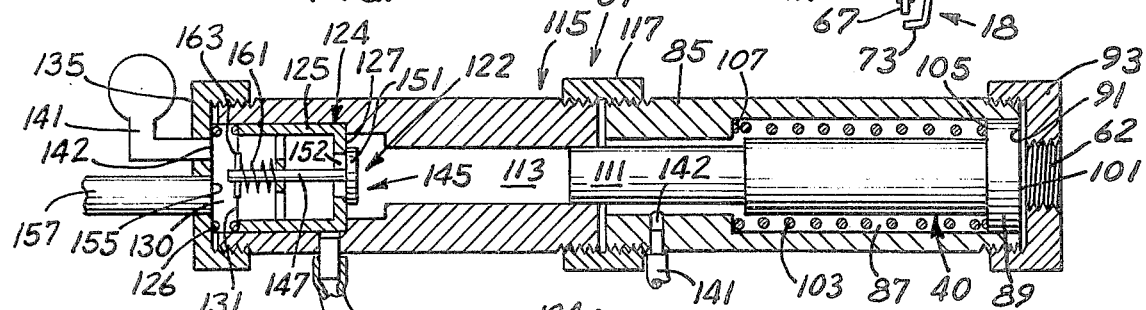
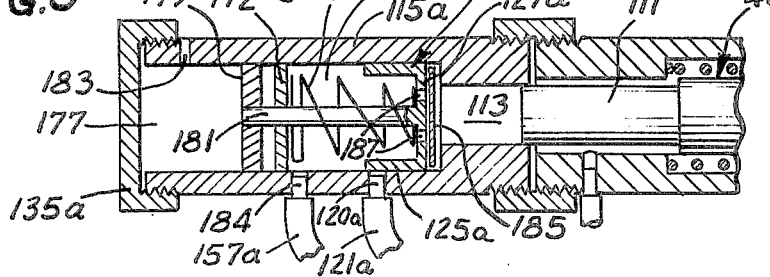
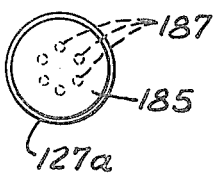

WATER INJECTION SYSTEM FOR I.C. ENGINES

This invention relates to a water injector system for internal combustion engines and more particularly to a water injection system for injecting water directly into the combustion chambers of the engine.

Various systems have been proposed for conveying water vapor into the combustion chambers of an internal combustion engine to increase the power output therefrom and also to provide for better fuel economy. Some systems are available on the market today for connection to existing automotive engines for the purposes of conveying water vapor into the combustion chambers. Usually, these systems involve the carburetion process with water vapor being combined with the air fuel mixture flowing into the combustion chambers. It has also been suggested that the injection of water into the combustion chambers will lower the peak combustion chambers which are primarily responsible for the formation of nitric oxide in the exhaust gases and thereby lower the level of nitric oxide in the exhaust gases. Despite the above benefits which may accrue from the addition of water vapor to the combustion chamber, the original equipment manufacturers of engines commonly used in trucks and automobiles have not provided water injection systems on their engines.

Those systems which inject water into the carburetion systems are limited in the amount of water vapor the air will carry and must be concerned with the problems of moisture condensing or forming on the walls of the various manifold passages and chambers which, at best, are made for the efficient flow of fuel and air only without heavy loads of moisture therein. While others have suggested injecting the water under pressure into the combustion cylinders during some portion of the cycle of the engine, these direct injection systems appear complex, costly and require a major reworking of the existing automotive engines. From an original equipment manufacturer's standpoint, it appears that automobile and truck purchasers are not willing to pay the significant increase in price for water injection equipment of conventional designs. For use in automotive or truck internal combustion engines, the water injection system should be inexpensive, simple and relatively maintenance free.

In accordance with the present invention, a water injection system may be applied directly to existing types of engines without having to provide elaborate bores or holes or other changes to the basic engine block or head configuration. The cost of tooling changes alone would be a major undertaking for automative companies. Also, with the present invention, the water injection system is of such simplicity that it may be readily installed by individuals or mechanics in existing automotive engines without a major reworking of the engine. The simplicity of the design of the water injecting pump means makes it possible from a cost standpoint to readily realize savings in fuel economy that will justify the installation cost of such a water injection system.

Accordingly, an object of the present invention is to provide a new and improved water injector system for internal combustion engines.

Other objects and advantages of the invention will become apparent from the following detailed description taken in connection with the accompanying drawings in which:

FIG. 1 is a perspective view of an internal combustion engine embodying the water injection system and the novel features of invention;

FIG. 2 illustrates a cross section of a combustion chamber having a water injection housing attached thereto in accordance with the preferred embodiment of the invention;

FIG. 3 is a cross-sectional view of a water injection pump means constructed in accordance with the preferred embodiment of the invention;

FIG. 4 is an end view of the water injection nozzle and spark ignition means; and FIGS. 5 and 6 illustrate another embodiment of the water injection pump means.

As shown in the drawings for the purposes of illustration, the invention is embodied in a water injection system 10 for an internal combustion engine 12 having at least one combustion chamber 14 within which takes place the ignition and burning of the fuel air mixture to drive a piston 16. The fuel is ignited by spark plug electrode means 18 after a valve means 20 for the combustion chamber is closed and the fuel and air mixture have been compressed in the combustion chamber 14. In this instance, the piston 16 is the usual reciprocating piston rather than a rotary piston.

In accordance with the present invention, water droplets or vapor may be injected into the combustion chamber 14 directly and against the pressure of the compressed fuel air mixture therein without having to redesign or to machine the engine to provide water injection ports therein. This is achieved by substituting for the conventional spark plug an adapter means 25 which includes a water injecting nozzle means 27 extending through an opening 29 already provided in the engine for the conventional spark plug and which also includes the spark generating electrode means 18. Thus, both the spark generating means 18 and the injection nozzle means may be inserted through the same opening 29. Preferably, the adapter means 25 is provided with a screw thread 33 for screwing into the threaded opening 29 which would have received the threaded end of a conventional spark plug. The preferred adapter means 25 also is provided with a gas passageway 35 through which the combustion gas pressure in the combustion chamber 14 is communicated to operate automatically with a water injector means 37 which may be carried by the adapter means 25.

As will be explained in greater detail, it is preferred that the rise in pressure of the combusting gases at the initial burning of the fuel be communicated through the gas passageway 35 to a piston 40 of the water injection means 37 to shift the piston and thereby force water through the injection nozzle means 27 into the combustion chamber 14 during the burning of the fuel. The spray of the moisture droplets is precisely regulated so as not to interfere with the burning process to the detriment of the power output; but the spray is regulated to control the burning with initial generation of steam to add power to drive the piston and to also lower the maximum temperature of combustion thereby reducing the nitric oxide omissions with the exhaust gas from the combustion chamber 14. Better gas mileage will also result. In this illustrated embodiment of the invention, the spark generating means 18 comprises a spark plug 42 which is narrower and thinner than the conventional spark plug. The spark plug 42 may be connected at its upper end 69 to the usual ignition wires (not shown)

for producing the spark for igniting the mixture within the combustion chamber.

Referring now in greater detail to the individual elements of the water injection system, the adapter means 25 includes an outer, encompassing airtight housing wall 50 having a lower cylindrical section 51 which is formed with an external screw thread 33 for screwing into the internal screw threaded opening 29 which usually receives the spark plug in the standard automotive engine illustrated herein. A compression washer 53 abuts an annular shoulder 55 at the lower end of the cylindrical housing section for sealing engagement with the cylinder head of the engine to prevent the escape of gases and the loss of compression in the engine during the operation thereof. The adapter means 25 is provided with an upper section 56 and an enlarged generally rectangular shaped chamber 57 having an upper and outwardly facing side wall 59 provided with a screw thread 61 for threading engagement with screw thread 62 formed on the lower end of the water injection means 37. The upper section 56 also is provided with another upwardly facing wall 63 which has an aperture through which extends the usual spark plug body 65 carrying an internal of central spark plug conductor wire 67 leading to the outer spark plug electrode end 69 for connection to the ignition wires. The spark plug body 65 may also be sealed with the housing to prevent the loss of any pressure in the chamber 57. As best seen in FIGS. 3 and 4, the spark plug may be bent at an angle with the lower portion being of smaller diameter and of generally straight configuration having an outer cylindrical insulator 71 extending downwardly about the central electrode 67 to a location adjacent a bent tip 73 of a ground electrode 75. The tip of the central electrode 67 and the tip 73 of the ground electrode provide the spark generating gap.

For the purpose of conveying water to the injector nozzle means 27, a small downwardly extending pipe 75 is carried within the adapted means 25 and at its lower end carries a nozzle 27 for spraying the moisture into a predetermined spray pattern into the burning fuel. The pipe is located adjacent the adapter section wall, as best seen in FIG. 4, and extends upwardly into the chamber 57 and is bent into an angular shape with an end 79 projecting outwardly through one of the housing walls 81 and having a sealed relationship with this wall to prevent the escape of any gases from the chamber 57.

To be commercially successful, the water injection means 37 must be relatively simple and made of relatively maintenance free parts so as to provide a reliable and yet inexpensive construction. This is particularly true when it is realized that a common V-8 automotive engine has eight cylinders and that most automobiles have at least four cylinders. Thus, the cost of one adapter means 25 has to be multiplied by the number of cylinders for the engine. As will be explained in greater detail, the illustrated injector means 37 is made with relatively simply constructed parts which may be readily and cheaply mass produced by screw machines from existing stock materials. The piston 40 is mounted for sliding within a cylinder casing 85 of generally cylindrical shape having an inner large diameter bore 87 at one end which receives the piston 40. The piston 40 has an enlarged head 89 which seats against an inner facing side 91 of an end cap 93 having the internal thread 62 for screwing and attaching to the thread 61 on the adapter housing 56. The central bore in the end cap exposes one end wall 101 of the piston 40 to the pressure in the combustion chamber 14 during the engine cycle.

To assist in seating the piston 40 against the forces of the gas in the combustion chamber 14 during the compression stroke, as best seen in FIG. 5, an internal compression spring 103 is placed within the cylinder bore 87 with one end resting against an annular shoulder 105 on the piston 40 and with its opposite end abutting a shoulder 107 defining the end of the enlarged bore 87 of the cylinder casing 85. Herein, the spring 103 is of sufficient strength that it will hold the piston 40 until the gases begin burning. That is, the normal compression stroke with the compressing of the air and fuel mixture prior to ignition does not have sufficient force on the piston 40 to have it compress the spring 103. For instance, the gas pressure on the piston face to move the piston against the spring force during ignition may be required to be at least 5 p.s.i. greater than the usual maximum compression pressure so that the piston will not be displaced during the compression stroke.

For the purpose of forcing the water into the combustion chamber against the high gas pressures therein, the piston 40 is provided with a smaller water piston driving end 111 which extends into a bore 113 in a water chamber casing 115. Preferably, the water chamber casing 115 is of generally the same size as the piston casing 85 and each of them are joined together at their abutted ends by a threaded collar 117. The illustrated driving end 111 of the piston 40 is formed with a diameter which is one-half of the diameter of the piston face 101. Thus, the area of the large end will be about four times that of the small end so that the water will receive a force of about 4 times that of the combustion pressure gases and this has been found sufficient to spray the incoming water through the injection nozzle means 27 into the combustion chamber 14 against the pressure of the combusting gases.

The water is normally retained within the cylinder bore 113 against outflow through an outlet port 120 by a valve means which, in this instance, is in the form of a spring biased check valve 122. Herein, the check valve 122 comprises a generally cylindrical or piston valve body 124 having annular skirt wall 125 which is spring biased by a compression spring 126 to abut its forward circular end wall 127 against a shoulder wall 129 formed in an enlarged bore 130 at the outer end of the water chamber casing 115. In this position, the skirt wall 125 of the check valve body 124 covers the outlet port 120. Herein, the biasing spring 126 extends between an end cap 135 and an annular end 131 of the piston skirt wall 125 to bias the same to the closing position. The spring 126 has the strength to maintain the port 120 closed until the main piston 40 forces the water in the chamber to push the valve body to the left, as viewed in FIG. 5, to allow the water in the chamber 113 to flow outwardly through the port 120 and through a connecting conduit 121 extending in and connected to the end 79 of the injector nozzle pipe 55.

To provide for a smooth operation, it is preferred to provide some dampening of the movement of the piston 40 and the check valve body 124. In this instance, an air chamber device is provided with a common connection or conduit pipe 141 connected to a port 142 in the end cap 135 which is screwed onto the end of the water casing 115. This air provides a bounce chamber to prevent the slamming of the check valve body 124.

A similar conduit pipe 141 is connected to a port 142 in the casing 85 leading to its bore 87 in which is air.

During the engine intake stroke, when a negative pressure is present within the combustion chamber 14, the spring 103 is able to return the piston 40 to the position shown in FIG. 3 causing a reduced pressure within the water chamber bore 113. A water inlet check valve 145 is carried by the check valve body 124 and includes a valve stem 147 having a circular end 151 disposed to cover or uncover a central opening 152 in the valve body end wall 127. When the opening 152 is uncovered, water may flow therethrough into the chamber bore 113. A port 155 in the end cap 135 is connected by a common water feed pipe 157 to a common reservoir for the water. Preferably, the water is supplied under slight pressure for flow through the conduit 157 and port 155 and opening 152 to rapidly fill the chamber bore. The water inlet check valve 145 is biased to close position shown in FIG. 3 by a spring 161 compressed between a cross pin 163 fixed to the end of the valve stem 147 and a stationary rod 165 fastened to the annular piston skirt 125. Thus, the spring 161 acts to force, as viewed in FIG. 3, the left end of the valve stem 147 to the left until incoming water pressure and the lowered pressure in the chamber 113 unseats the valve stem end 151 and allows the water to flow through the opening 152 into the chamber 113.

In accordance with a further embodiment of the invention, as shown in FIGS. 5 and 6, the left-hand portion of the water injection means 37 may be changed to simplify its construction. Common reference characters with the suffix *a* are used hereinafter in describing elements identical to or substantially identical to the elements above described in detail in connection with FIGS. 1–4.

A cylindrical casing 115a carries a slidable check valve piston 124a having an annular skirt 125a for covering a water outlet port 120a in the casing 115a. The piston 124a is spring biased to the position shown in FIG. 5 with its annular wall 125a covering the outlet port 120a by a compressed coil spring 171 disposed between an internal chamber wall 172 and the interior side of the piston face 127a of the piston 124a. The chamber wall 172 is fixed in the bore of the casing 115 and divides into a water receiving chamber 175 in which the piston 124a travels and an air chamber 177 in which travels a piston 179, the latter being secured to a piston stem 181 which is secured at its other end to a piston 124a. The piston stem 181 extends through an aperture in the stationary wall 172. The end cap wall 135a closes one end of the air chamber 177 which functions as an air bounce chamber for cushioning the movements of the valve piston 124a to prevent metal to metal contact between the piston and the end cap wall 135a. An air bleed hole 183 is formed in the casing 115a to allow air to enter and exit the air bounce chamber 177 with piston movement therein.

The water inlet pipe 157a is connected through a port 184 between the stationary divider wall 172 and piston face 127a to allow water to enter into a space 175 therebetween. When the piston 124a and its integral skirt 125a are moved to inject the water and to uncover the port 120a, the annular skirt 125a is then positioned to cover the water inlet port 184.

When reduced pressure is formed on the forward or right side of the piston face 127a, as seen in FIG. 5, a small wafer valve plate 185 shifts to uncover apertures 187 in the piston face 127a allowing water to flow into the chamber 113 and against the piston face of the small diameter piston 111. The disk is held captured adjacent the piston face 127a in a conventional manner. On the other hand, when the piston 40 is being driven by the ignition gas pressures to the left the piston 111 forces the disk 185 tightly against the piston face to cover the apertures 187 allowing the measured volume within the chamber 113 to be driven outwardly through the port 120a for injection into the piston cylinder.

From the foregoing it will be seen that the present invention provides a unique low cost water injection system which does not require the special machining or drilling of apertures in the head of the engine. The use of simple screw machine parts allows the water injection apparatus to be inexpensively manufactured and assembled.

While a preferred embodiment has been shown and described, it will be understood that there is no intent to limit the invention by such disclosure but, rather, it is intended to cover all modifications and alternate constructions falling within the spirit and scope of the invention as defined in the appended claims.

In an engine constructed in accordance with the preferred embodiment of the invention, the ratio of water to fuel was in the ratio of 3 parts water to 1 part fuel irrespective of the torque being produced by the engine. The combustion pressures increase with the increase in fuel during heavy loads and likewise the amount of water being used increases with heavy loads to maintain a generally 3 to 1 ratio of water to fuel. For instance, for each gallon of fuel used by the engine, there will be used about three gallons of water. Because the water is injected during the hot combustion cycle, this substantial amount of water does not wet or otherwise prevent ignition as would occur should the same amount of water be introduced prior to combustion.

What is claimed is:

1. A water injection system for an internal combustion engine having a combustion chamber comprising,
    an adapter means having an end for attachment to an engine at an opening to admit a spark plug,
    means on said adapter means for securing it to the engine at the spark plug opening,
    ignition generating electrodes extending inwardly beyond the inner end of said adapter means and having an inner end projecting into said combustion chamber of said engine,
    water injector nozzle means extending to the inner end of said adapter means and through the opening into the combustion chamber from said adapter means and having a nozzle in the engine combustion chamber for injecting moisture into a combustion chamber,
    and injection means connected to said nozzle means to deliver water under pressure to said injector nozzle means for injecting the water directly into the combustion chamber against the pressure of the compressed air fuel mixture in the combustion chamber.

2. A water injection system in accordance with claim 1 in which a passageway means in said adapter means 1 allows the gas pressure from the combustion chamber to be communicated to said injection means to cause the latter to inject the water through said nozzle means.

3. A water injection system in accordance with claim 2 in which said injection means comprises a piston having one end in fluid communication with said gas passageway means to be moved by the gas pressure in said combustion chamber, spring means biasing said piston to a first position to hold the same until a predetermined gas pressure is exceeded in said combustion chamber, said piston being movable against the biasing of said spring means by higher gas pressures in said combustion chamber and forcing water through said injector nozzle.

4. A water injection system in accordance with claim 3 in which said injection means comprises a cylinder means secured to said adapter means, said piston being positioned in said cylinder for reciprocating movement and having a first diameter end exposed to the gas pressure from said gas passageway means and another smaller diameter and exposed to water in the cylinder means.

5. In an internal combustion engine, the combination comprising,
   an engine block having a plurality of combustion chambers therein,
   a cylinder head on said engine block,
   a plurality of openings in said cylinder head leading to said combustion chambers,
   adapter means secured to said engine at each of said openings,
   ignition electrodes on each of said adapter means for extending through one of said openings and into one of said combustion chambers for igniting the fuel,
   water injection nozzles extending from each of said adapter means through each of said openings and into each of said combustion chambers for injecting water into said combustion chambers,
   gas pressure conduit means in each of said adapter means for communicating the gas pressure in each of said combustion chambers,
   and water injection means connected to each of said water injection nozzles to supply water thereto under pressure and connected to said gas pressure conduit means to be operated by gas pressure from its respectively associated combustiom chamber.

6. An internal combustion engine in accordance with claim 5 in which said water injection means comprises a cylinder means on each of said adapter means and an internal piston in each of said cylinder means operated by said gas pressure to force water through said injection nozzles.

7. An internal combustion engine in accordance with claim 6 in which an external thread is provided on a lower end of each of said adapter means and in which said threads are screwed into said openings in said cylinder head.

8. An internal combustion engine in accordance with claim 6 in which said cylinder means includes a water chamber and in which said piston acts on the water in said water chamber to force the water to and through its associated injection nozzle against the pressure of the compressed fuel and air in its associated combustion chamber.

* * * * *